(12) United States Patent
Hage (10) Patent No.: US 11,361,340 B2
(45) Date of Patent: *Jun. 14, 2022

(54) METHODS AND APPARATUS TO IDENTIFY A TYPE OF MEDIA PRESENTED BY A MEDIA PLAYER

(71) Applicant: The Nielsen Company (US), LLC, New York, NY (US)

(72) Inventor: Chad A. Hage, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,421

(22) Filed: Mar. 8, 2021

(65) Prior Publication Data

US 2021/0192561 A1 Jun. 24, 2021

Related U.S. Application Data

(63) Continuation of application No. 16/175,476, filed on Oct. 30, 2018, now Pat. No. 10,943,252, which is a
(Continued)

(51) Int. Cl.
*G06Q 30/02* (2012.01)

(52) U.S. Cl.
CPC ............... *G06Q 30/0241* (2013.01)

(58) Field of Classification Search
CPC .... G06Q 30/0241; G06F 16/951; G06F 17/00
See application file for complete search history.

(56) References Cited

U.S. PATENT DOCUMENTS

| 5,151,788 A | 9/1992 | Blum |
| 5,754,255 A | 5/1998 | Takamori |

(Continued)

FOREIGN PATENT DOCUMENTS

| EP | 1120732 | 8/2001 |
| JP | 2004157907 | 6/2004 |

(Continued)

OTHER PUBLICATIONS

Buscher et al., "Generating and Using Gaze-Based Document Annotations," CHI 2008 Proceedings—Works in Progress, Apr. 5-10, 2008, Florence, Italy, pp. 3045-3050, 6 pages.
(Continued)

*Primary Examiner* — Nhat Huy T Nguyen
(74) *Attorney, Agent, or Firm* — Hanley, Flight & Zimmerman, LLC (57) ABSTRACT

Methods and apparatus to identify a type of media presented by a media player are disclosed herein. Example apparatus disclosed herein include a data analyzer to determine whether a user-selectable media application control presented in a user interface was activated in response to a user attempt to activate a user-selectable media application control while a media player application presented media. Disclosed example apparatus also include a media type analyzer to determine at least one of the media is an advertisement or the media includes an advertisement in response to a determination that the user-selectable media application control presented in the user interface was not activated in response to the user attempt to activate the user-selectable media application control while the media player application presented the media.

20 Claims, 7 Drawing Sheets

Related U.S. Application Data continuation of application No. 13/840,807, filed on Mar. 15, 2013, now abandoned.

(56) References Cited

U.S. PATENT DOCUMENTS

| | | |
|---|---|---|
| 5,987,171 A | 11/1999 | Wang |
| 5,999,688 A | 12/1999 | Iggulden et al. |
| 5,999,689 A | 12/1999 | Iggulden |
| 6,014,458 A | 1/2000 | Wang |
| 6,046,740 A | 4/2000 | LaRoche et al. |
| 6,311,194 B1 | 10/2001 | Sheth et al. |
| 6,353,929 B1 | 3/2002 | Houston |
| 6,362,894 B1 | 3/2002 | Shima |
| 6,430,583 B1 | 8/2002 | Taguchi |
| 6,460,023 B1 | 10/2002 | Bean et al. |
| 6,519,648 B1 | 2/2003 | Eyal |
| 6,535,880 B1 | 3/2003 | Musgrove et al. |
| 6,643,641 B1 | 11/2003 | Snyder |
| 6,714,933 B2 | 3/2004 | Musgrove et al. |
| 6,721,741 B1 | 4/2004 | Eyal et al. |
| 6,725,222 B1 | 4/2004 | Musgrove et al. |
| 6,725,275 B2 | 4/2004 | Eyal |
| 6,970,602 B1 | 11/2005 | Smith et al. |
| 7,013,310 B2 | 3/2006 | Messing et al. |
| 7,082,426 B2 | 7/2006 | Musgrove et al. |
| 7,149,982 B1 | 12/2006 | Duperrouzel et al. |
| 7,162,696 B2 | 1/2007 | Wakefield |
| 7,200,801 B2 | 4/2007 | Agassi et al. |
| 7,231,381 B2 | 6/2007 | Li et al. |
| 7,251,790 B1 | 7/2007 | Drucker et al. |
| 7,269,330 B1 | 9/2007 | Iggulden |
| 7,272,785 B2 | 9/2007 | Fukuda et al. |
| 7,281,034 B1 | 10/2007 | Eyal |
| 7,451,391 B1 | 11/2008 | Coleman et al. |
| 7,584,194 B2 | 9/2009 | Tuttle et al. |
| 7,685,273 B1 | 3/2010 | Anastas et al. |
| 7,809,154 B2 | 10/2010 | Lienhart et al. |
| 7,954,120 B2 | 5/2011 | Roberts et al. |
| 8,019,162 B2 | 9/2011 | Zhang et al. |
| 8,196,164 B1 | 6/2012 | Oztaskent et al. |
| 8,290,351 B2 | 10/2012 | Plotnick et al. |
| 8,572,505 B2 | 10/2013 | Lee et al. |
| 8,650,587 B2 | 2/2014 | Bhatia et al. |
| 9,639,531 B2 | 5/2017 | Deliyannis |
| 2002/0023271 A1 | 2/2002 | Augenbraun et al. |
| 2002/0056089 A1 | 5/2002 | Houston |
| 2002/0063727 A1 | 5/2002 | Markel |
| 2002/0080165 A1 | 6/2002 | Wakefield |
| 2002/0091764 A1 | 7/2002 | Yale |
| 2002/0114002 A1 | 8/2002 | Mitsubori et al. |
| 2003/0004272 A1 | 1/2003 | Power |
| 2003/0066070 A1 | 4/2003 | Houston |
| 2003/0237027 A1 | 12/2003 | Cook |
| 2004/0003102 A1 | 1/2004 | DuVall et al. |
| 2004/0021686 A1 | 2/2004 | Barberis |
| 2004/0145778 A1 | 7/2004 | Aoki et al. |
| 2004/0177096 A1 | 9/2004 | Eyal et al. |
| 2004/0189720 A1 | 9/2004 | Wilson et al. |
| 2004/0221311 A1 | 11/2004 | Dow et al. |
| 2004/0254956 A1 | 12/2004 | Volk |
| 2004/0254958 A1 | 12/2004 | Volk |
| 2004/0267812 A1 | 12/2004 | Harris et al. |
| 2005/0025348 A1 | 2/2005 | Tecu |
| 2005/0041858 A1 | 2/2005 | Celi, Jr. et al. |
| 2005/0231648 A1 | 10/2005 | Kitamura et al. |
| 2005/0262438 A1 | 11/2005 | Armstrong et al. |
| 2006/0015571 A1 | 1/2006 | Fukuda et al. |
| 2006/0026162 A1 | 2/2006 | Salmonsen et al. |
| 2006/0041589 A1 | 2/2006 | Helfman et al. |
| 2006/0120590 A1 | 6/2006 | Han et al. |
| 2006/0120692 A1 | 6/2006 | Fukuta |
| 2006/0230011 A1 | 10/2006 | Tuttle et al. |
| 2006/0242192 A1 | 10/2006 | Musgrove et al. |
| 2006/0259938 A1 | 11/2006 | Kinoshita et al. |
| 2006/0271977 A1 | 11/2006 | Lerman et al. |
| 2006/0282494 A1 | 12/2006 | Sima et al. |
| 2007/0047766 A1 | 3/2007 | Rhoads |
| 2007/0073758 A1 | 3/2007 | Perry et al. |
| 2007/0124110 A1 | 5/2007 | Tung |
| 2007/0130525 A1 | 6/2007 | Murphy et al. |
| 2007/0150612 A1 | 6/2007 | Chaney et al. |
| 2007/0168543 A1 | 7/2007 | Krikorian et al. |
| 2007/0172155 A1 | 7/2007 | Guckenberger |
| 2007/0237426 A1 | 10/2007 | Xie et al. |
| 2007/0239839 A1 | 10/2007 | Buday et al. |
| 2007/0271300 A1 | 11/2007 | Ramaswamy |
| 2007/0277088 A1 | 11/2007 | Bodin et al. |
| 2007/0294252 A1 | 12/2007 | Fetterly et al. |
| 2008/0034306 A1 | 2/2008 | Ording |
| 2008/0046562 A1 | 2/2008 | Butler |
| 2008/0046738 A1 | 2/2008 | Galloway et al. |
| 2008/0082426 A1 | 4/2008 | Gokturk et al. |
| 2008/0089666 A1 | 4/2008 | Aman |
| 2008/0109724 A1 | 5/2008 | Gallmeier et al. |
| 2008/0120420 A1 | 5/2008 | Sima et al. |
| 2008/0140712 A1 | 6/2008 | Weber et al. |
| 2008/0141162 A1 | 6/2008 | Bockus |
| 2008/0158361 A1 | 7/2008 | Itoh et al. |
| 2008/0222273 A1 | 9/2008 | Lakshmanan et al. |
| 2008/0229240 A1 | 9/2008 | Garbow et al. |
| 2008/0229427 A1 | 9/2008 | Ramirez |
| 2008/0294981 A1 | 11/2008 | Balzano et al. |
| 2008/0313177 A1 | 12/2008 | Li et al. |
| 2008/0319844 A1 | 12/2008 | Hua et al. |
| 2009/0047000 A1 | 2/2009 | Walikis et al. |
| 2009/0109337 A1 | 4/2009 | Imai et al. |
| 2009/0172723 A1 | 7/2009 | Shkedi et al. |
| 2009/0222754 A1 | 9/2009 | Phillips et al. |
| 2009/0248672 A1 | 10/2009 | Mcintire et al. |
| 2009/0254553 A1 | 10/2009 | Weiskopf et al. |
| 2009/0259926 A1 | 10/2009 | Deliyannis |
| 2009/0268261 A1 | 10/2009 | Banton et al. |
| 2009/0291665 A1 | 11/2009 | Gaskarth et al. |
| 2010/0023660 A1 | 1/2010 | Liu |
| 2010/0080411 A1 | 4/2010 | Deliyannis |
| 2010/0162301 A1 | 6/2010 | Minnick |
| 2010/0174983 A1 | 7/2010 | Levy et al. |
| 2011/0122939 A1 | 5/2011 | Ganesan et al. |
| 2011/0283311 A1 | 11/2011 | Luong |
| 2012/0047010 A1 | 2/2012 | Dowling et al. |
| 2012/0047234 A1 | 2/2012 | Terayoko |
| 2012/0109743 A1 | 5/2012 | Balakrishnan et al. |
| 2012/0304223 A1 | 11/2012 | Sargent et al. |
| 2013/0090097 A1 | 4/2013 | Klassen et al. |
| 2013/0097702 A1 | 4/2013 | Alhamed et al. |
| 2013/0173402 A1 | 7/2013 | Young et al. |
| 2014/0155022 A1 | 6/2014 | Kandregula |
| 2014/0281980 A1 | 9/2014 | Hage |
| 2015/0039637 A1 | 2/2015 | Neuhauser et al. |
| 2015/0156332 A1 | 6/2015 | Kandregula |
| 2019/0066148 A1 | 2/2019 | Hage |

FOREIGN PATENT DOCUMENTS

| | | |
|---|---|---|
| JP | 2008171039 | 7/2008 |
| WO | 9827497 | 6/1998 |
| WO | 2002047467 | 6/2002 |
| WO | 2005043288 | 5/2005 |
| WO | 2005086081 | 9/2005 |
| WO | 2006058075 | 6/2006 |
| WO | 2007018102 | 2/2007 |
| WO | 2007041647 | 4/2007 |
| WO | 2008021459 | 2/2008 |

OTHER PUBLICATIONS

Fu et al., "Detecting Phishing Web Pages with Visual Similarity Assessment Based on Earth Mover's Distance (EMD)," IEEE Transactions on Dependable and Secure Computing, vol. 3, No. 4, Oct.-Dec. 2006, 11 pages.

Australian Government, "Examiner's First Report", issued in connection with Patent Application No. 2009222570 dated May 3, 2010, 1 page.

(56) References Cited

OTHER PUBLICATIONS

Australian Government, "Examiner's Report", issued in connection with Patent Application No. 2009222570 dated Jun. 6, 2011, 1 page.
Australian Government "Examiner's First Report", issued in connection with Patent Application No. 2008354332 dated Jul. 26, 2011, 2 pages.
IP Australia, "Patent Examination Report No. 1", issued in connection with Patent Application No. 2011239269 dated Feb. 6, 2013, 3 pages.
Australian Government, "Notice of Acceptance", issued in connection with Patent Application No. 2008354332, dated Apr. 5, 2013, 2 pages.
Canadian Intellectual Property Office, "Requisition by the Examiner", issued in connection with Patent Application No. 2,680,955 dated Oct. 5, 2011, 3 pages.
Canadian Intellectual Property Office, "Office Action", issued in connection with Patent Application No. 2,680,955 dated Sep. 27, 2012, 4 pages.
Chinese State Intellectual Property Office, "First Office Action", issued in connection with Patent Application No. 2009102214165 dated Nov. 30, 2011, 5 pages.
Chinese State Intellectual Property Office, "Second Office Action", issued in connection with Patent Application No. 2009102214165 dated Aug. 23, 2012, 17 pages.
Chinese State Intellectual Property Office, "Third Office Action", issued in connection with Patent Application No. 2009102214165 dated May 17, 2013, 9 pages.
European Patent Office, Extended European Search Report issued in connection with European Patent Application No. 09012337.3 dated Jan. 7, 2010, 8 pages.
International Searching Authority, "International Search Report", issued in connection with corresponding to International Patent Application No. PCT/US2008/059783, dated Aug. 13, 2008, 6 pages.
International Searching Authority, "Written Opinion of the International Searching Authority", issued in connection with International Patent Application No. PCT/US2008/059783 dated Aug. 13, 2008, 6 pages.
Patent Cooperation Treaty, "International Preliminary Report on Patentability", issued in connection with international application No. PCT/US2008/059783 dated Oct. 12, 2010, 6 pages.
Japanese Patent Office, "Office Action with redacted summary in English", issued in connection with Application No. 2011-503955 dated May 14, 2012, 5 pages.
Japanese Patent Office, "Second Office Action with redacted summary in English", issued in connection with Application No. 2011-503955 dated Mar. 19, 2013, 4 pages.
United States Patent and Trademark Office. "Final Office Action", issued in connection with U.S. Appl. No. 12/240,756 dated Jun. 24, 2011, 19 pages.
United States Patent and Trademark Office, "Advisory Action", issued in connection with U.S. Appl. No. 12/240,756 dated Nov. 1, 2011, 3 pages.
Canadian Intellectual Property Office, "Examiner's Report", issued in connection with Canadian Patent Application No. 2,680,955, dated Nov. 13, 2013, 3 pages.
United States Patent and Trademark Office, "Non-Final Office Action", issued in connection with U.S. Appl. No. 12/100,264 dated Feb. 7, 2011, 10 pages.
United States Patent and Trademark Office, "Final Office Action", issued in connection with U.S. Appl. No. 12/100,264 dated Aug. 4, 2011, 18 pages.
United States Patent and Trademark Office, "Non-Final Office Action", issued in connection with U.S. Appl. No. 12/100,264 dated Feb. 14, 2014, 19 pages.
United States Patent and Trademark Office, "Non-Final Office Action", issued in connection with U.S. Appl. No. 12/240,756 dated Feb. 22, 2011, 9 pages.
United States Patent and Trademark Office, "Non-Final Office Action", issued in connection with U.S. Appl. No. 12/240,756 dated Apr. 1, 2014, 20 pages.
Japanese Patent Office, "Decision of Rejection", issued in connection with Japanese Patent Application No. 2011-503955 dated Aug. 13, 2013, 2 pages.
United States Patent and Trademark Office, "Final Office Action", issued in connection with U.S. Appl. No. 12/100,264 dated Oct. 9, 2014, 20 pages.
IP Australia, "Notice of Acceptance", issued in connection with Australian Patent Application No. 2011239269 dated Oct. 15, 2014, 2 pages.
IP Australia, "Patent Examination Report No. 1", issued in connection with Australian Patent Application No. 2013203736 dated Oct. 20, 2014, 2 pages.
Canadian Intellectual Property Office, "Examiner's Report", issued in connection with Canadian Patent Application No. 2,680,955 dated Dec. 15, 2014, 6 pages.
United States Patent and Trademark Office, "Final Office Action", issued in connection with U.S. Appl. No. 12/240,756 dated Dec. 17, 2014, 22 pages.
United States Patent and Trademark Office, "Non-Final Office Action," issued in connection with U.S. Appl. No. 13/706,244 dated Mar. 25, 2014, 14 pages.
United States Patent and Trademark Office, "Final Office Action", issued in connection with U.S. Appl. No. 13/706,244 dated Sep. 12, 2014, 23 pages.
United States Patent and Trademark Office, "Advisory Action", issued in connection with U.S. Appl. No. 13/706,244, dated Feb. 17, 2015, 3 pages.
IP Australia, "Notice of Grant", issued in connection with Australian Patent Application No. 2011239269 dated Feb. 12, 2015, 2 pages.
United States Patent and Trademark Office, "Non-Final Office Action", issued in connection with U.S. Appl. No. 14/621,010 dated Mar. 17, 2015, 17 pages.
United States Patent and Trademark Office. "Non-Final Office Action", issued in connection with U.S. Appl. No. 13/955,163 dated Aug. 13, 2015, 12 pages.
United States Patent and Trademark Office, "Non-Final Office Action," issued in connection with U.S. Appl. No. 12/100,264 dated Dec. 17, 2015, 13 pages.
United States Patent and Trademark Office, "Final Office Action", issued in connection with U.S. Appl. No. 13/955,163 dated Mar. 1, 2016, 11 pages.
IP Australia, "Notice of Acceptance", issued in connection with Australian Patent Application No. 2013203736 dated Nov. 13, 2015, 2 pages.
IP Australia, "Notice of Grant", issued in connection with Australian Patent Application No. 2008354332 dated Aug. 1, 2013, 2 pages.
Australian Intellectual Property Office, "Notice of Grant", issued in connection with Australian Patent Application No. 2013203736 dated Mar. 23, 2016, 1 page.
United States Patent and Trademark Office, "Non-Final Office Action", issued in connection with U.S. Appl. No. 13/955,163 dated Jun. 27, 2016, 14 pages.
United States Patent and Trademark Office, "Final Office Action", issued in connection with U.S. Appl. No. 12/100,264 dated Jul. 28, 2016, 19 pages.
United States Patent and Trademark Office, "Advisory Action", issued in connection with U.S. Appl. No. 12/100,264 dated Oct. 13, 2016, 3 pages.
United States Patent and Trademark Office, "Final Office Action", issued in connection with U.S. Appl. No. 13/955,163 dated Dec. 23, 2016, 17 pages.
United States Patent and Trademark Office, "Notice of Allowance", issued in connection with U.S. Appl. No. 12/100,264 dated Dec. 22, 2016, 12 pages.
United States Patent and Trademark Office, "Non-Final Office Action", issued in connection with U.S. Appl. No. 13/840,807 dated Feb. 26, 2015, 12 pages.
United States Patent and Trademark Office, "Final Office Action", issued in connection with U.S. Appl. No. 13/840,807 dated Jul. 8, 2015, 16 pages.

(56) References Cited

OTHER PUBLICATIONS

United States Patent and Trademark Office, "Non-Final Office Action", issued in connection with U.S. Appl. No. 13/840,807 dated Mar. 24, 2016, 13 pages.

United States Patent and Trademark Office, "Final Office Action", issued in connection with U.S. Appl. No. 13/840,807 dated Aug. 5, 2016, 13 pages.

United States Patent and Trademark Office, "Notice of Panel Decision from Pre-Appeal Brief Review", issued in connection with U.S. Appl. No. 13/840,807 on Jan. 19, 2017, 2 pages.

United States Patent and Trademark Office, "Examiner's Answer to Appeal Brief", issued in connection with U.S. Appl. No. 13/840,807 on May 2, 2017, 13 pages.

United States Patent and Trademark Office, "Examiner's Second Answer to Appeal Brief", issued in connection with U.S. Appl. No. 13/840,807 on Oct. 12, 2017, 13 pages.

United States Patent and Trademark Office, "Decision on Appeal", issued in connection with U.S. Appl. No. 13/840,807 on Aug. 30, 2018, 6 pages.

United States Patent and Trademark Office, "Non-final Office action", issued in connection with U.S. Appl. No. 15/482,317, dated Jul. 27, 2018, 16 pages.

United States Patent and Trademark Office, "Final Office action," issued in connection with U.S. Appl. No. 15/482,317, dated Feb. 25, 2019, 15 pages.

United States Patent and Trademark Office, "Office action," issued in connection with U.S. Appl. No. 15/482,317, dated Sep. 19, 2019, 14 pages.

United States Patent and Trademark Office, "Final Office Action", issued in connection with U.S. Appl. No. 15/482,317 dated Apr. 6, 2020, 14 pages.

United States Patent and Trademark Office, "Non-Final Office Action," issued in connection with U.S. Appl. No. 16/175,476, dated Dec. 12, 2019, 15 pages.

United States Patent and Trademark Office, "Final Office Action", issued in connection with U.S. Appl. No. 16/175,476 dated Jun. 5, 2020, 18 pages.

United States Patent and Trademark Office, "Notice of Allowance and Fee(s) Due", issued in connection with U.S. Appl. No. 16/175,476 dated Oct. 28, 2020, 6 pages.

METHODS AND APPARATUS TO IDENTIFY A TYPE OF MEDIA PRESENTED BY A MEDIA PLAYER

RELATED APPLICATION

This patent arises from a continuation of U.S. patent application Ser. No. 16/175,476, entitled "METHODS AND APPARATUS TO IDENTIFY A TYPE OF MEDIA PRESENTED BY A MEDIA PLAYER," filed on Oct. 30, 2018, which is a continuation of U.S. patent application Ser. No. 13/840,807, entitled "METHODS AND APPARATUS TO IDENTIFY A TYPE OF MEDIA PRESENTED BY A MEDIA PLAYER," filed on Mar. 15, 2013. Priority to U.S. patent application Ser. No. 16/175,476 and U.S. patent application Ser. No. 13/840,807 is claimed. U.S. patent application Ser. No. 16/175,476 and U.S. patent application Ser. No. 13/840,807 are herein incorporated by reference in their respective entireties.

FIELD OF THE DISCLOSURE

This disclosure relates generally to metering advertisements, and, more particularly, to metering advertisements streamed in a media player.

BACKGROUND

Media players on electronic devices (e.g., smartphones, tablet computers, computers, etc.) enable access to a wide range of media. The media can be streamed from the Internet via a browser or an application dedicated for streaming media or playing media.

Many media streaming websites or applications stream advertisements along with content selected for presentation by a viewer or machine (e.g., web crawler). For example, if a viewer chooses to view a video on YouTube™, an advertisement may be streamed in a media player application 154 of YouTube™ before the chosen video is presented.

DETAILED DESCRIPTION

Example methods and apparatus disclosed herein determine a type of media presented in a media player (or media player application 154) based on an ability to manipulate (e.g., select, activate, deactivate, adjust, etc.) a control of the media player. An example method includes determining if a media application control is selectable when media is presented by the media player application 154; and determining whether the media presented includes a specified type of media in response to determining if the media application control is selectable.

An example apparatus includes a control state analyzer to determine if a control of media player is selectable when the media player is presenting media, and a media type analyzer to determine that the media is a specified type of media in response to determining that the control is selectable or not selectable.

In some examples an image analyzer is used to process an image of a media player application 154 to identify if a control is selectable based on the appearance of a corresponding control indicator. In some examples, control data monitor is used to monitor a stream of data to the media player that includes control data indicating whether a control is enabled or disabled.

Example methods and apparatus disclosed herein may identify whether an advertisement or media including an advertisement is presented by a media player or media player application 154. Considering the ever increasing amount of media that is accessible to potential audience members via the Internet, "on-demand" applications, or other similar technologies, there is a great opportunity for advertising. Accordingly, many, but not all media that can be downloaded, streamed, or viewed includes an advertisement. Determination of the presence of an advertisement in downloaded or streamed media may be beneficial to entities, such as audience measurement entities (e.g., The Nielsen Company). Knowing which pieces of media include an advertisement and which pieces of media do not include an advertisement may enable such entities to process (e.g., determine an advertisement source or creator) fewer videos by only processing the videos determined to include an advertisement.

Figure 1:
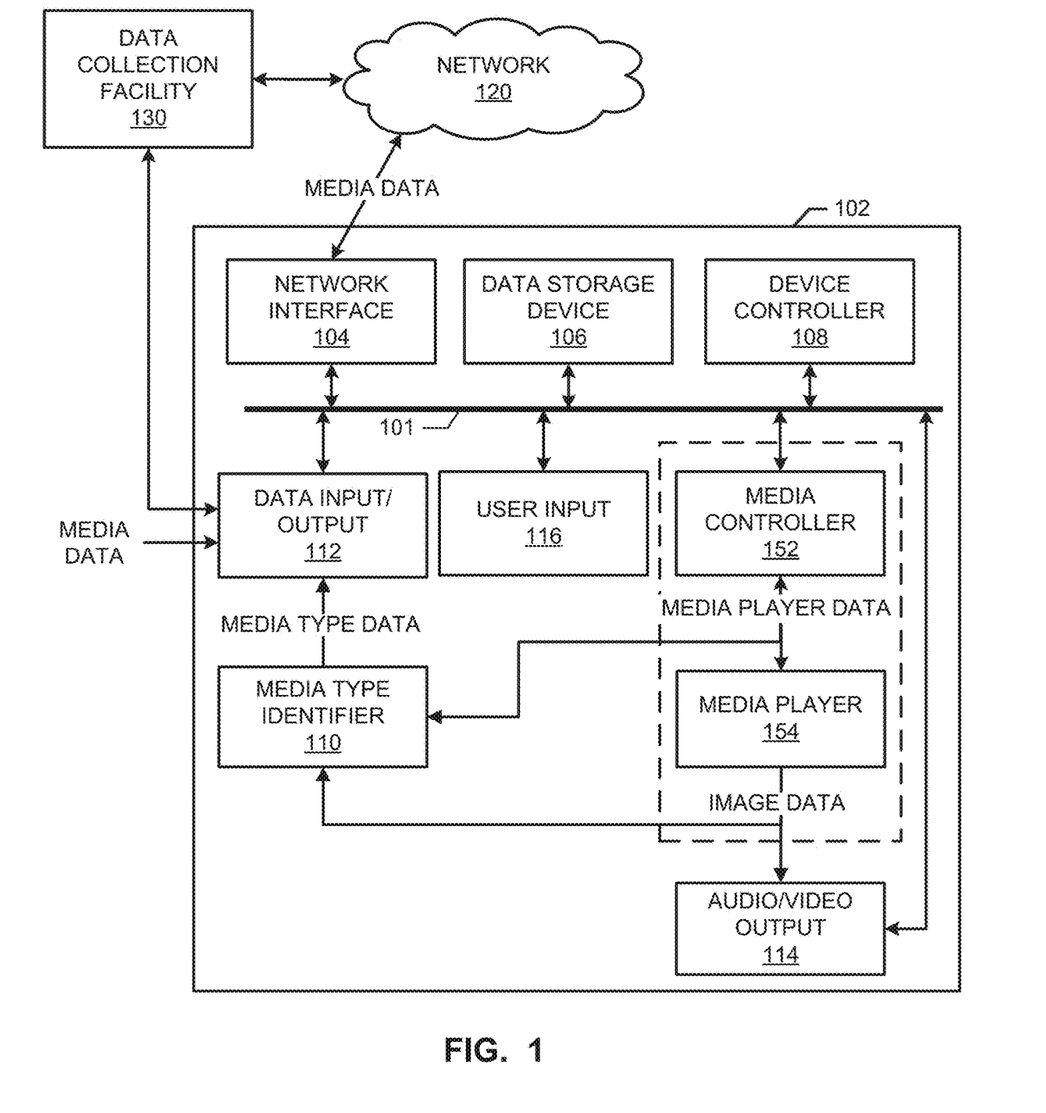
FIG. 1 is a block diagram of an example data system with a media device including a media type identifier constructed in accordance with the teachings of this disclosure.

FIG. 1 is a block diagram of an example data system 100 for an example media device 102 including an example media type identifier 110 constructed in accordance with the teachings of this disclosure. The example media device 102 may be a smartphone, a television, an MP3 player (e.g., an iPod™), a tablet computer, a computer, a web crawler (such as the web crawler of U.S. Publication No. 2009/0259926, herein incorporated by reference), etc. The example data system 100 includes the media device 102, an example network 120 (e.g., a local area network (LAN), a wide area network (WAN), the Internet, etc.), and an example data collection facility 130. The example media device 102 may communicate with the data collection facility 130 directly and/or via the network 120.

The example media device 102 includes an example network interface 104, an example data storage device 106, an example device controller 108, an example media type identifier 110, an example data input/output 112, an example audio/video output 114 (e.g., a display (e.g., a speaker, a liquid crystal display (LCD), a light-emitting diode (LED) display, etc.), an example user interface 116, and an example media presenter 150. An example communication bus 160 facilitates communication between the network interface 104, the data storage device 106, the device controller 108, the data input/output 112, the audio/video output 114, the user interface 116, and/or the media presenter 150. The example media presenter 150 includes an example media controller 152 and an example media player application 154.

In the illustrated example of FIG. 1, the media device 102 receives media from the network 120 (e.g., media streamed and/or downloaded from the Internet) via the network interface 104. In some examples, the media device 102 receives media via the data input/output 112 from another device (e.g., a flash drive, a mobile device, a digital camera or digital video recorder, or other device capable of transferring media to the media device 102). The data input/output 112 may facilitate wired (e.g., universal serial bus (USB), serial, etc.) communication or wireless (e.g., Bluetooth, Wi-Fi, infrared (IR), etc.) communication. In some examples, the received media is stored (or buffered) in the data storage device 106. The example device controller 108 controls the media device 102 (e.g., in response to input via the user interface 116) and monitors and/or controls communication between the media device 102 and/or other devices or the network 120. The example audio/video output 114 enables a user to view and/or hear media via the media device 102 and may include a display, speakers, etc. The user interface 116 enables a user to control the media device 102 and may be one or more of a touchscreen, mouse, keyboard, etc.

In the illustrated example of FIG. 1, a user may browse the network 130 for media to be played via the media presenter 150. Media data is downloaded and/or streamed from the network and forwarded to the media controller 152. The media controller 152 decodes and converts the media to media player data, which is forwarded to the media player application 154. The media player application 154 generates the images of the media, and the media presenter presents the media for display via the audio/video output 114.

The example media type identifier 110 identifies a type of media presented by the media presenter 150. The example media presenter 150 of FIG. 1 may be one or more of a web browser (e.g., Internet Explorer, Google™ Chrome™, Mozilla Firefox™, Safari™, etc.) or a media application (e.g., a Hulu™ application, a Netflix™ application, a YouTube™ application, etc.). In some examples, at least one of the media presenter 150, media controller 152, and/or media player application 154 may be a single device or element and/or combined to form a single device or element.

For example, the media type may be an advertisement or content. As described herein, content is one or more of programming (e.g., a television program, radio program, web video, etc.), media for streaming (e.g., a YouTube™ video, etc.), etc. that a user (or a robot) expects to be presented by the media presenter 150 following a selection by the user (e.g., via a user interface) or a selection by a robot (e.g., via a web crawler). The media presenter 150 receives media data from the communication bus 101 and the media controller 152 instructs the media player application 154 to present the media according to the media data and control signals received from the media player application 154. In some examples, the media data corresponds to a media presentation that includes multiple types of media. For example, the media data received from a streamed video over the Internet may include both the content and an advertisement.

In the example of FIG. 1, the media controller 152 retrieves and/or receives media data to be converted and displayed by the media player application 154. For example, the media controller 152 may retrieve and/or receive media data from the network interface 104 and/or the data storage device 106 based on instructions from the device controller 108 to present the corresponding media via the audio/video output 114 (e.g., in response to a user request, or a "selection" by a web crawler). In some examples, the media controller 152 provides the media player data to the media player application 154 for presentation in response to a user request received via the user interface 116.

In some examples of FIG. 1 in which the media device 102 is a web crawler, the device controller 108 may automatically download and/or stream media and control playback of the media by providing instructions to the media controller 152 and/or manipulating the controls of the media player application 154. In some such examples, the web crawler is acting as if a user is controlling the media player application 154 to identify how the media player reacts to certain controls being selected. For example, the device controller 108 may "act" like a user by sending a signal that a control of the media player was "selected" (e.g., as if a user selected the control via the user interface 116 in an attempt to activate the control). In such examples, the media device 102, including the media type identifier 110, can monitor the reaction of the media player application 154 (e.g., whether or not the control is activated). In some such examples, the reaction of the media player application 154 may be used to determine a control is selectable.

The example media player data may include, but is not limited to, media presentation data, media player control data (e.g., data indicating whether controls of the media player application 154 are to be selectable, enabled or disabled, etc. while presenting the media such that the control cannot be activated (e.g., turned on), cannot be selected (e.g., turned off), and/or cannot be adjusted), a uniform resource locator (URL) associated with the media, media source data (e.g., source of origination such as YouTube®, Hulu®, a media application, etc.), etc. The example media type identifier 110 receives the media player data and image data generated by the media player application 154 to be displayed on the audio/video output 114. The media type identifier 110 determines the type of media based on the media data and image data (e.g., whether it is an advertisement or content).

As described herein, the media identifier 110 determines a state of one or more controls (e.g., whether the control(s) is/are selectable or not, able to be activated/deactivated, manipulated, etc.) of the media player application 154. Based on the state of the controls, the identifier 110 determines the type of media presented by the media player application 154. In some examples, the media type identifier 110 extracts control data from the media player data to identify whether a control is enabled or disabled.

Figure 2:
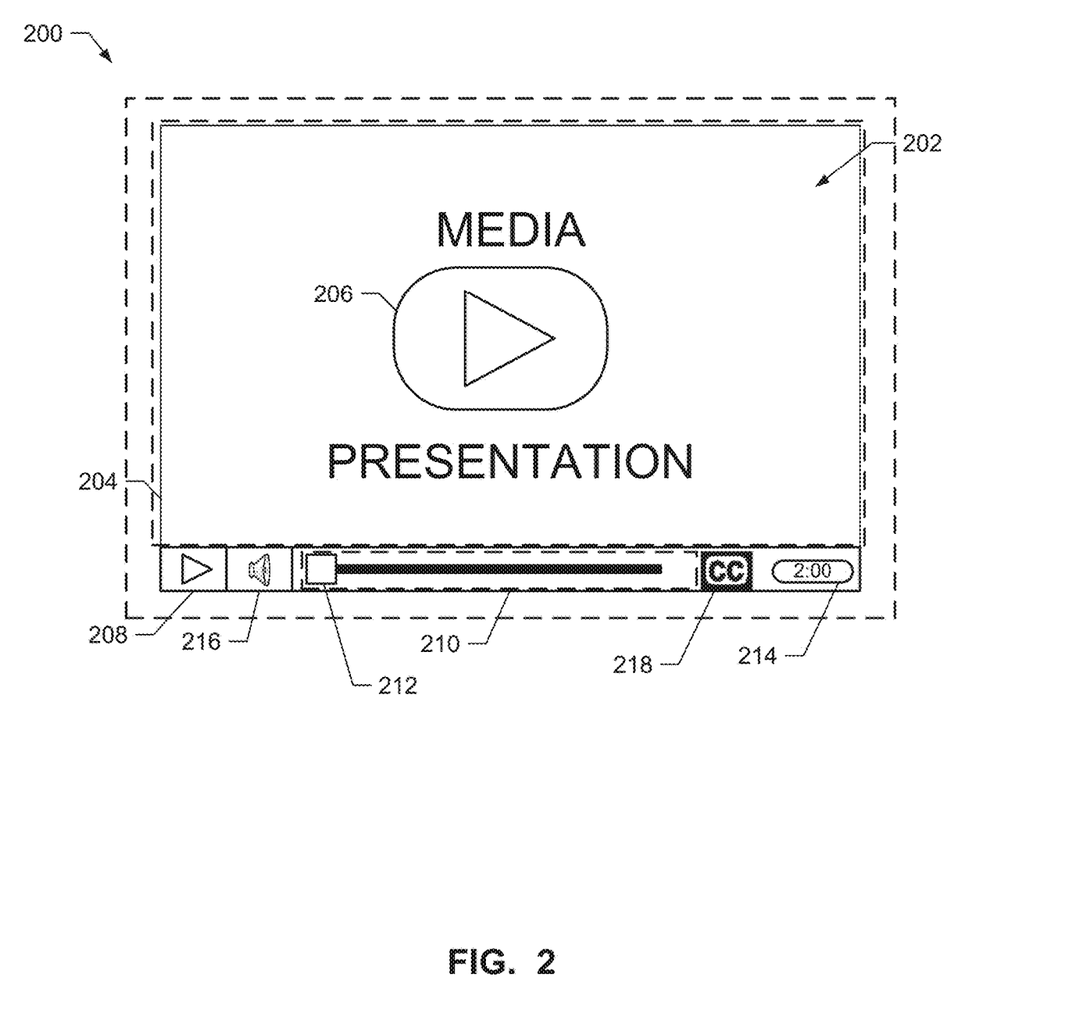
FIG. 2 is an illustration of an example media player application 154 display presented by the media device of FIG. 1.

FIG. 2 is an example media player application 154 display 200, which may be generated and/or controlled by the media presenter 150, the media controller 152, and/or media player application 154 of FIG. 1, presenting example media 202. The media player application 154 display 200 may be presented via the media device 102 of FIG. 1. The example media player application 154 presents the display 200 to show a media area 204, which displays the media 202 (e.g., advertisements, content, etc.) therein. The media player application 154 display 200 further includes a play button 206 and a play/pause button 208. The play button 206 is displayed at the start of playing of the media 202 (i.e., before playing begins) and disappears when the media 202 is playing. The play/pause button 208 displays a play symbol when the media 202 is not playing (e.g., when the media 202 is paused or stopped) and a pause symbol (not shown) when the media 202 is playing or buffering. The example media player application 154 display 200 also includes a progress bar 210, which displays to a user the current location (e.g., time, frame, etc.) of the media 202 with respect to the beginning (the far left side of the progress bar 210) and end (the far right side of the progress bar 210) of the media 202 using a progress bar indicator 212.

In this example, a countdown timer 214 is also included, which displays the remaining time play of the media 202 when played at a predetermined speed. However, a count up timer may also be used independently or in conjunction with a play time indicator (e.g., the countdown timer 214) to display the play time of the media 202 relative to the beginning and/or the end of the media 202. In some examples, the progress bar 110, the progress bar indicator 112, and/or the countdown timer 214 identify timing of content of the media 202. In the illustrated example, the media player application 154 display 200 includes a volume control 216 to control the output level of any audio content that may be part of the media 202. Furthermore, the example media player application 154 display 200 includes a closed captioning control 218 to control activation or deactivation of closed captioning in any content that may be part of the media 202.

In some examples disclosed herein, one or more of the media player controls 206-218 may be enabled or disabled based on a type of the media 202. When the controls are enabled, a user can control the corresponding control 206-218 (e.g., control the volume output, activate/deactivate closed captioning, etc.). When the controls 206-218 are disabled, the user cannot control the corresponding control 206-218 (e.g., cannot adjust volume, cannot activate fast forward, cannot activate closed captioning, etc.). In some examples, when the media 202 is an advertisement, one or more of the controls 206-218 may be disabled. For example, a user may not be able to activate or deactivate closed captioning using the closed captioning control 218 when the media 202 is an advertisement. In some examples, when one or more of the controls 206-218 are disabled, they appear "grayed out" (not shown) on the media player application 154 display 200.

In some examples, where the device 102 is implemented by a web crawler, the web crawler accesses web pages including one or more media player application 154 display(s) 200. The example web crawler may then process one or more image(s) of the web pages to identify media player application 154 display(s) 200. The example web crawler may then process images of the identified media player application 154 display(s) 200 to control and/or manipulate the media player to begin playback. In some examples, the web crawler may attempt to select or manipulate (e.g., activate/deactivate) the controls 206-218 by "clicking" (or performing an operation to imitate "clicking") the corresponding buttons of the controls 206-218. A media identifier 110 included in the example web crawler identifies the type of media (e.g., content, an advertisement, etc.) based on whether controls are enabled or disabled. The media identifier may make such a determination by at least one or an appearance of the controls 206-218 (e.g., whether "grayed out" or not) and/or control data in the media player data.

Figure 3:
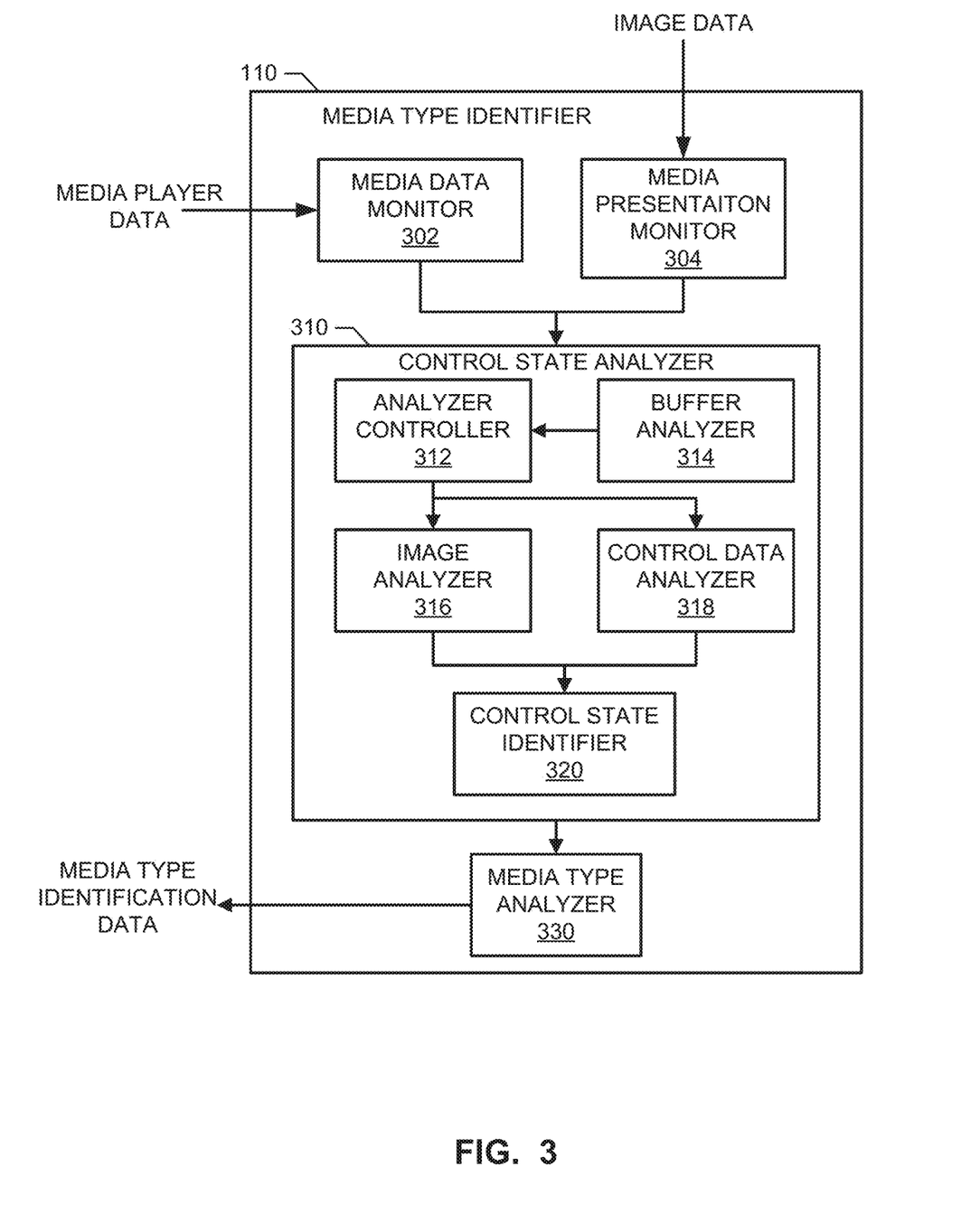
FIG. 3 is a block diagram of an example implementation of the media type identifier of FIG. 1.

FIG. 3 is a block diagram of an example implementation of the media type identifier 110 of FIG. 1. The example media type identifier 110 of FIG. 3 includes a media data monitor 302, a media presentation monitor 304, a control state analyzer 310, and a media type analyzer 330. The example control state analyzer 310 includes an example analyzer controller 312, an example buffer analyzer 314, an example image analyzer 316, an example control data analyzer 318, and an example control state identifier 320.

The example media data monitor 302 monitors the media player data transmitted between the media controller 152 and the media player application 154. In some examples, the media data monitor 302 extracts control data from the media player data indicating a state (e.g., enabled or disabled, selectable, etc.) of one or more media player controls (e.g., fast forward, closed captioning, etc.) of the media player application 154. In some examples, the media data monitor 302 sends query messages (e.g., by attempting to select, activate, or enable a control of the media player application 154) to determine and/or retrieve control data from the media controller 152 and/or the media player application 154 (e.g., if control data is not sent to the media player after attempting to enable the control, it can be inferred that the control is disabled).

The example media presentation monitor 304 of FIG. 3 monitors the media presented by the media player application 154 by retrieving and/or receiving image data generated by the media player application 154. The example media presentation monitor 304 determines whether the media player application 154 has been loaded and/or whether media (including advertisements and/or content) is being presented by the media player application 154. In some examples, the media presentation monitor 304 determines whether media is paused, is loading, or is buffering. In some examples, the media presentation monitor 304 identifies the state of the media player application 154 based on the images generated by the media player application 154. The media data monitor 302 and the media presentation monitor 304 provide the retrieved/received information from monitoring the media player data and the image data to the control state analyzer 310.

The example control state analyzer 310 uses the received information to determine the state (e.g., whether enabled or disabled, whether selectable, etc.) of a control of the media player application 154. The example analyzer controller 312 forwards image data received from the media presentation monitor 304 and forwards it to the image analyzer 316. Additionally or alternatively, the example analyzer controller 312 forwards control data (e.g., data indicating a status of a control of the media player application 154) from the media player data received from the media data monitor 302 and forwards it to the control data analyzer 318. In some examples, the analyzer controller 312 only provides the monitored data when the buffer analyzer 314 detects that media player application 154 is not buffering. For example, the buffer analyzer 314 may perform an image analysis of the media player application 154 to determine whether the media player application 154 is buffering. The example buffer analyzer 314 may prevent the control state analyzer 310 from falsely identifying a state of a control due to buffering media. For example, some example media player application 154 controls may be disabled (i.e., may not be selectable, activated, deactivated, etc.) while the media player application 154 is buffering.

The example image analyzer 316 uses image processing techniques to analyze the images of the media player application 154 (e.g., the media player application 154 display 200 of FIG. 2). While identifying the media player, the example image analyzer 316 identifies media player application 154 controls (e.g., fast forward, closed captioning, etc.) that a user (or a robot) may select or manipulate to control playing of the media. In some examples, the image analyzer 316 provides information corresponding to the identified controls to the control data analyzer 318. For example, the image analyzer 316 may indicate to the control data analyzer 318 that a closed captioning control is present on the media player application 154 display 200 of FIG. 2, and the control data analyzer 316 may then monitor for control data corresponding to closed captioning in the media player data. In some examples, the image analyzer 316 provides image data corresponding to one or more controls to the control state identifier 320 to determine the state of the one or more controls.

The example control data analyzer 318 analyzes control data embedded within the media player data streamed between the media controller 152 and the media player application 154. For example, the control data may be a message indicating whether a control (e.g., fast forward or closed captioning) is selectable or whether the control can be activated, deactivated, adjusted, etc. As another example, the control data may be a bit indicator in the media player data designated to indicate whether a control is selectable. In some examples, the control data analyzer 318 analyzes control messages transmitted to/from the media player application 154 and forwards the communication to the control state identifier 320. For example, the control data analyzer 318 may determine that a user attempted to enable an ability to activate/deactivate closed captioning by identifying a closed captioning request message being sent to the media controller 152 to enable closed captioning on the media player application 154, but not identifying control data in the media player data that enables the closed captioning. In this example, the control state identifier 320 may infer that closed captioning is disabled.

The example control state identifier 320 identifies the state (e.g., enabled or disabled) of a control based on the data provided by the image analyzer 316 and/or the control data analyzer 318. For example, if data from the image analyzer 316 indicates that a control button corresponding to a control is "grayed out" (i.e., the button appears gray to a user indicating that it cannot be selected) the control state identifier 320 determines that the control is disabled. In some examples, the control data analyzer 318 provides the value of a bit indicator corresponding to a control and or control data corresponding to a control and the control state identifier determines the control state based on the control data value. For example, a value of 0 for a control bit indicator indicates that the control is disabled, and a value of 1 indicates that the control is enabled. In some examples, the control state identifier 320 may receive control message data. For example, the control state identifier may receive control messages or requests transmitted between the media controller 152 and the media player application 154 indicating whether the control is to be enabled or disabled for corresponding media (e.g., disable for advertisement and enable for content).

The example control state analyzer 310 provides data indicating the control state to the media type analyzer 330. For example, the control state identifier 320 provides data indicating whether a corresponding control is selectable. Based on the received state of the control, the example media type analyzer 330 determines the type of media being presented by the media player application 154 and/or a type of media included in the media being presented by the media player application 154. For example, if the control state identifier 320 indicates that the control is disabled, the media type analyzer 330 may determine that the media is an advertisement. Alternatively, in the above example, if the control state identifier 320 indicates that the control is enabled, the media type analyzer 330 may determine that the media is the content. In some examples, the media type analyzer 330 forwards data corresponding to the identified media type to the data output 112 of FIG. 1 for processing. In some such examples, a record may be stored in the data storage device 106 and/or at the data collection facility 130 indicating which videos are an identified type of media. For example, such a record may indicate which videos streamed from a website or via an application include an advertisement and which videos do not include an advertisement.

While an example manner of implementing the media type identifier 110 of FIG. 1 is illustrated in FIG. 3, one or more of the elements, processes and/or devices illustrated in FIG. 3 may be combined, divided, re-arranged, omitted, eliminated and/or implemented in any other way. Further, the example media data monitor 302, the example media presentation monitor 304, the example control state analyzer 310, the example analyzer controller 312, the example buffer analyzer 314, the example image analyzer 316, the example control data analyzer 318, the example control state identifier 320, the example media type analyzer 330 and/or, more generally, the example media type identifier 110 of FIG. 3 may be implemented by hardware, software, firmware and/or any combination of hardware, software and/or firmware. Thus, for example, any of the example media data monitor 302, the example media presentation monitor 304, the example control state analyzer 310, the example analyzer controller 312, the example buffer analyzer 314, the example image analyzer 316, the example control data analyzer 318, the example control state identifier 320, the example media type analyzer 330 and/or, more generally, the example media type identifier 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, media data monitor 302, the example media presentation monitor 304, the example control state analyzer 310, the example analyzer controller 312, the example buffer analyzer 314, the example image analyzer 316, the example control data analyzer 318, the example control state identifier 320, and/or the example media type analyzer 330 is/are hereby expressly defined to include a tangible computer readable storage device or storage disk such as a memory, a digital versatile disk (DVD), a compact disk (CD), a Blu-ray disk, etc. storing the software and/or firmware. Further still, the example media type identifier 110 of FIG. 3 may include one or more elements, processes and/or devices in addition to, or instead of, those illustrated in FIG. 3, and/or may include more than one of any or all of the illustrated elements, processes and devices.

Figure 4:
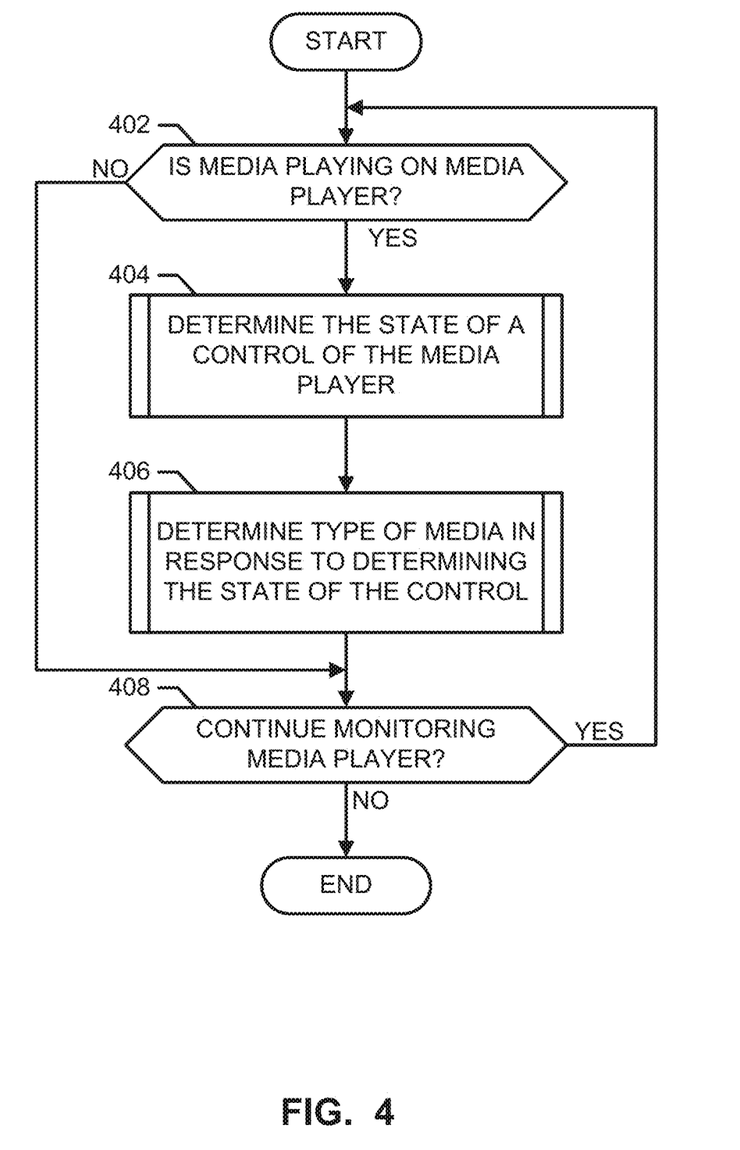
FIG. 4 is a flowchart representation of example machine readable instructions that may be executed to implement the example media type identifier of FIG. 3.
Figure 5:
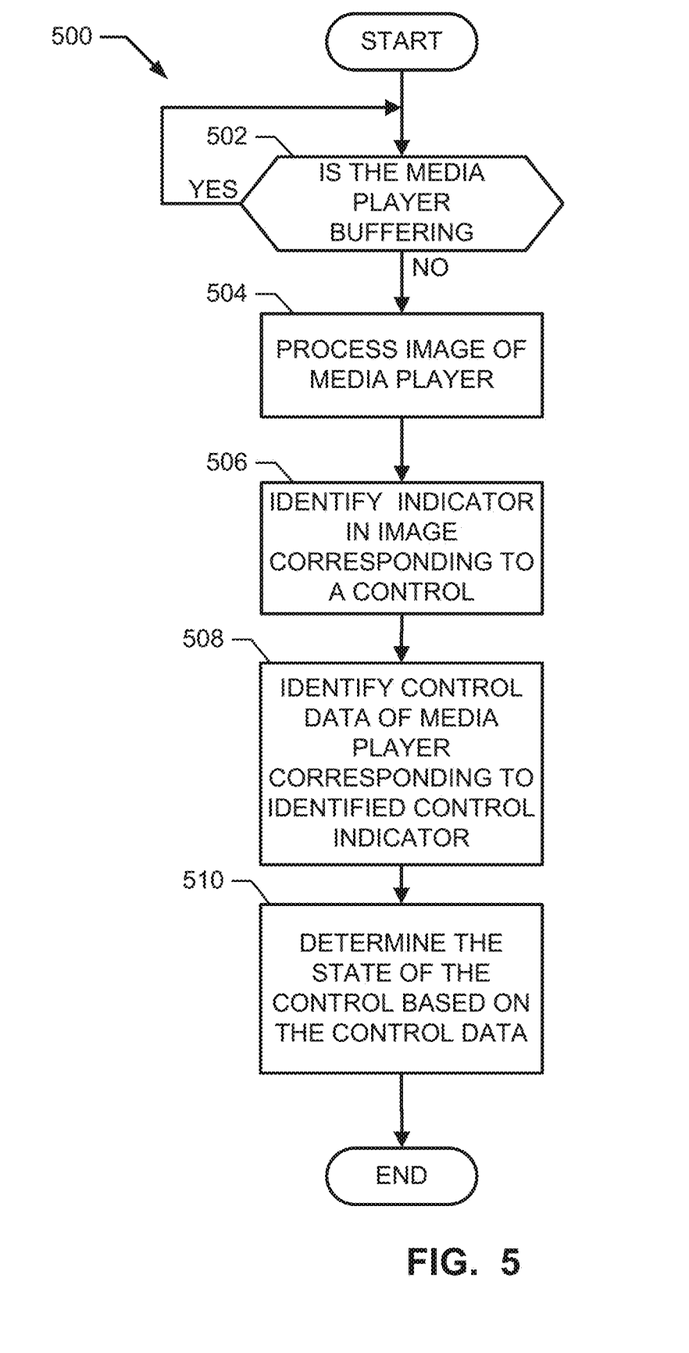
FIG. 5 is a flowchart representation of example machine readable instructions that may be executed to implement an example control state analyzer of FIG. 3.

Flowcharts representative of example machine readable instructions for implementing the media type identifier 110 of FIG. 3 are shown in FIGS. 4, 5, and/or 6. In this example, the machine readable instructions comprise one or more programs for execution by a processor such as the processor 712 shown in the example processor platform 700 discussed below in connection with FIG. 7. The one or more programs may be embodied in software stored on a tangible computer readable storage medium such as a CD-ROM, a floppy disk, a hard drive, a digital versatile disk (DVD), a Blu-ray disk, or a memory associated with the processor 712, but the programs, in whole and/or in part thereof, could alternatively be executed by a device other than the processor 712 and/or embodied in firmware or dedicated hardware. Further, although the one or more example programs is/are described with reference to the flowcharts illustrated in FIGS. 4, 5, and/or 6, many other methods of implementing the example media type identifier 110 may alternatively be used. For example, the order of execution of the blocks may be changed, and/or some of the blocks described may be changed, eliminated, or combined.

As mentioned above, the example processes of FIGS. 4, 5, and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The program 400 of FIG. 4 begins upon initiation of the media identifier 110 of FIGS. 1 and/or 3. At block 402, the media presentation monitor 304 of FIG. 3 determines whether media is being presented (or is playing) on the media player application 154. The example media presentation monitor 302 may determine that the media is playing on the media player application 154 based on a state (e.g., a loading state, a paused state, etc.) of the media player application 154, whether the media player application 154 is open on the media device 102, etc. If the media presentation monitor 304 determines that media is not playing on the media player application 154, control advances to block 408. If the media presentation monitor 304 determines that media is playing on the media player application 154, control advances to block 404.

At block 404, the control state analyzer 310 determines the state of a control of the media player application 154. In some examples, the control state analyzer 310 determines whether the control is enabled or disabled. For example, the control state analyzer may determine that a closed captioning control of the media player has been disabled. In some examples, the control state analyzer 310 determines the state of a control of the media player using the image analyzer 316. In some such examples, the image analyzer 316 uses image processing techniques to identify control indicators (e.g., the indicators identifying media application controls 206-218 of FIG. 2) and analyze the appearance of the indicators. Based on the appearance of the control indicators, the control state identifier 320 can determine the state of the control, such as whether the control is enabled or disabled.

In some examples, at block 404, the control state analyzer 310 determines the state of a control of the media player using the control data analyzer 318 in addition to or as an alternative to the image analyzer 316. In some such examples, the control data analyzer 318 identifies control data in stream of data transmitted between the media controller 152 and the media player application 154. For example, the control data analyzer 318 may identify messages and/or requests to enable or disable a control (e.g., one of the controls 206-218). Based on the identified control data, such as a value of a bit indicator for the corresponding control or a value of a control message, the control state identifier 320 determines the state of the control, such as whether the control is enabled or disabled.

In some examples, the state of the control may be determined as described in connection with FIG. 5.

After identifying the state of the control (block 404), at block 406, the media type analyzer 330 determines a type of media presented by the media player based on the state of the control. In some examples, a state of the control corresponds to the type of media being displayed. The correspondence between the state of the control and the media type may be predefined and/or programmed into the media type analyzer 330. The type of media may be determined as described in more detail in connection with FIG. 7.

Following identification of the type of media (block 406), at block 408, the analyzer controller 312 determines whether to continue monitoring the media player application 154. If the analyzer controller 312 is to no longer monitor the media player to identify a type of media presented (e.g., because of a system failure, system shutdown, etc.), then the program 400 ends. If the analyzer controller 312 is to continue monitoring the media player, control returns to block 402.

FIG. 5 illustrates a program 500, which may be used to implement the block 404 of FIG. 4 and may be executed to implement a portion of the example control state analyzer 310 of FIG. 3. The example program 500 is identifies the state of a control (e.g., closed captioning, fast forward, etc.) of the media player application 154. The program 500 begins when the control state analyzer 310 is initiated. At block 502, the buffer analyzer 314 determines whether the media player application 154 is buffering media. In some examples, the buffer analyzer 314 analyzes image data from the media presentation monitor 304 to determine whether the media player is buffering. For example, the buffer analyzer 314 may use image processing techniques to identify the word "buffering" or a buffering indicator in the image of the media player (e.g., the media player application 154 display 200). The buffer analyzer 314 may use other appropriate techniques to determine whether the media player is buffering data. If the media player is buffering data, control loops at block 502 until the buffer analyzer 314 determines that the media player is no longer buffering.

At block 504 of FIG. 5, the image analyzer 316 analyzes image data received from the media presentation monitor 304. At block 506, the image analyzer 316 analyzes the image data to identify a control indicator (e.g., a control button) in the image corresponding to a control (e.g., fast forward, closed captioning, etc.). The image analyzer 316 may use any appropriate image processing techniques to identify the control indicator.

Following identification of a control indicator (block 506), at block 508 the control data analyzer 318 monitors the media player data for control data corresponding to the identified control. For example, if the image analyzer 316 identified the closed captioning control button of FIG. 2, the control data analyzer 318 would then monitor the media player data for control data (e.g., messages/requests to activate or deactivate closed captioning) corresponding to closed captioning control.

At block 510 of FIG. 5, the example control state identifier 320 determines the state of the control based on the control data. In some examples, at block 510, the control state identifier 320 determines the state of the control based on control data (e.g., a bit indicator or request message to enable or disable the control) embedded in the media player data. In some examples, the control state identifier 320 determines the state of the control based on the absence of control data in communication between the media controller 152 and the media player application 154. For example, the control data analyzer 318 may determine that a control (e.g., the control 206-218) has been selected (e.g., by a user or a robot) based on a request to the media controller 152 to activate the control. In the event that a response message to activate the control is not sent to the media player application 154, the control state identifier 320 may infer that the control is disabled.

Figure 6:
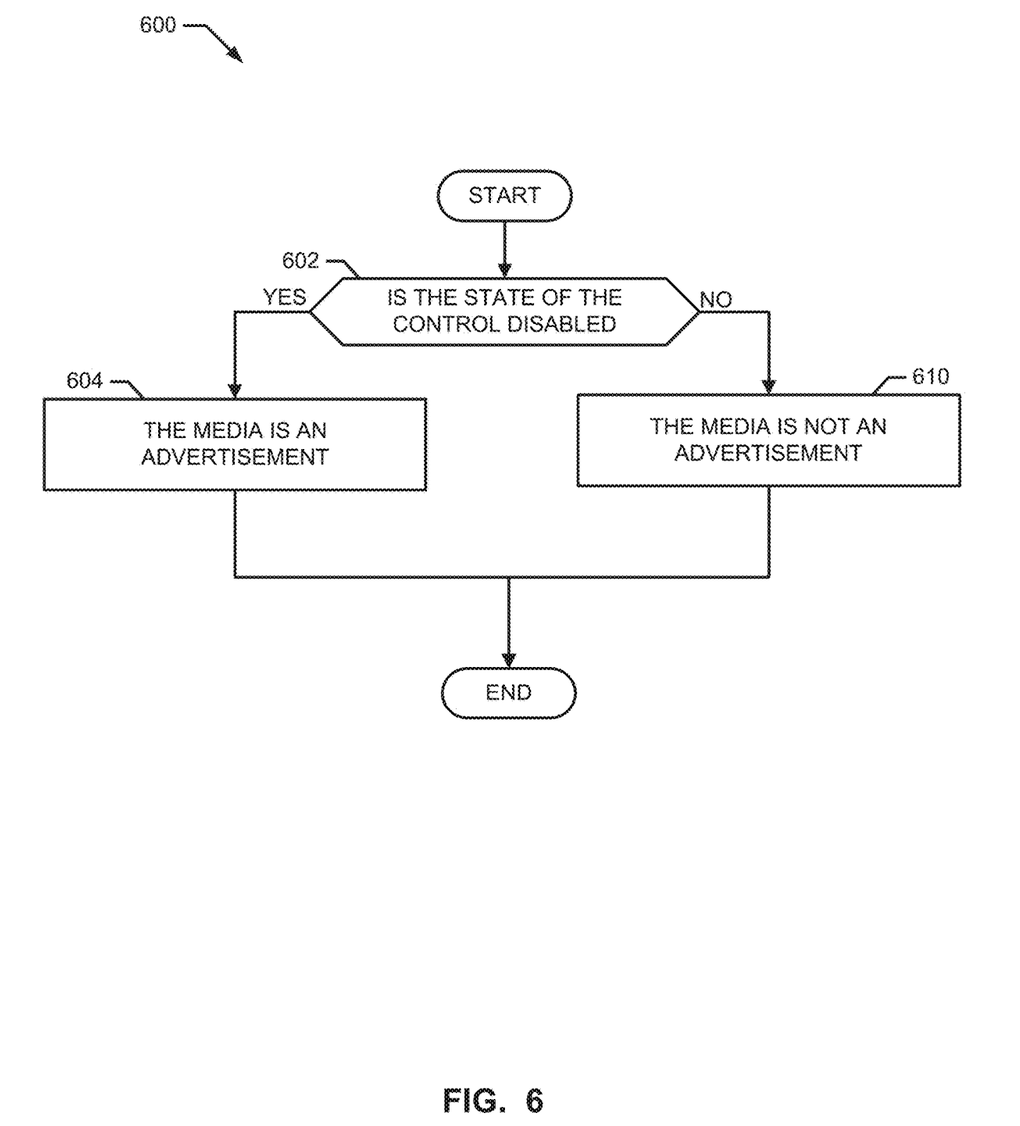
FIG. 6 is a flow chart representation of example machine readable instructions that may be executed to implement a media type analyzer of FIG. 3.

FIG. 6 illustrates a program 406, which may be used to implement the block 406 of FIG. 4 and may be executed to implement the example media type analyzer 330 of FIG. 3. The program 600 begins upon initiation of the media type analyzer 330 (e.g., following receipt of control state information). In the example of FIG. 6, the program 600 identifies a type of media based on a media player control state.

At block 602, the media type analyzer 330 determines whether the control is enabled or disabled. If the control is disabled, at block 604 the media type analyzer 604 determines that the media is an advertisement. If the control is not disabled (i.e., it is enabled), the media type analyzer 330 determines that the media is not an advertisement. In some such examples, the media is the content.

Figure 7:
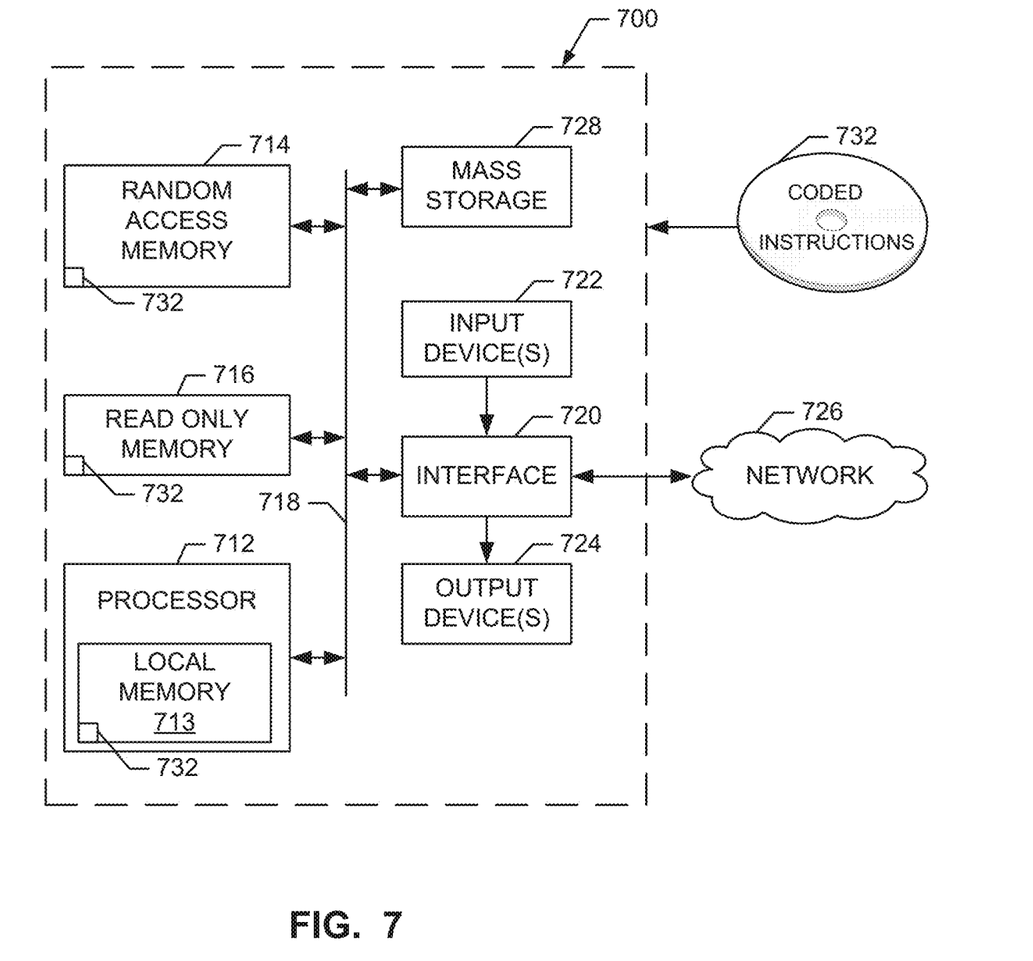
FIG. 7 is a block diagram of an example processing system capable of executing the example machine readable instructions of FIGS. 4, 5, 6, and/or 7 to implement the example media type identifier of FIG. 3.

FIG. 7 is a block diagram of an example processor platform 700 capable of executing the instructions of FIGS. 4, 5, and/or 6 to implement the media identifier 110 of FIG. 3. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device. The example processor platform 700 may be used to implement the media device 102 of FIG. 1.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system. The input device(s) 722 may be used to implement the user interface 116 of FIG. 1.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The output devices 724 may be used to implement the example audio/video output 114 of FIG. 1. The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4, 5, and/or 6 may be stored in the mass storage device 728, in the volatile memory 714, in the non-volatile memory 716, and/or on a removable tangible computer readable storage medium such as a CD or DVD.

From the foregoing, it will appreciate that the above disclosed methods, apparatus and articles of manufacture facilitate identification of a type of media (e.g., an advertisement) the presence of a type of media presented by a media player based on a state of a control of the media player application.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   means for analyzing data, the means for analyzing data to:
   analyze a control message associated with a media player application to determine whether a user attempted to activate a user-selectable media application control presented in a user interface while the media player application presented media; and
   analyze control data associated with the user-selectable media application control to determine whether the user-selectable media application control presented in the user interface was activated; and means for determining whether the media is an advertisement, the means for determining to:
  determine at least one of the media is not an advertisement or the media does not include an advertisement when (a) the user attempted to activate the user-selectable media application control and (b) the user-selectable media application control presented in the user interface was activated; and
  determine at least one of the media is an advertisement or the media includes an advertisement when (a) the user attempted to activate the user-selectable media application control and (b) the user-selectable media application control presented in the user interface was not activated.

2. The apparatus of claim 1, further including means for identifying the control data associated with the user-selectable media application control in a stream of data received by the media player application.

3. The apparatus of claim 1, further including means for storing data representative of the media.

4. The apparatus of claim 1, means for extracting the control data from media player data corresponding to the media player application.

5. The apparatus of claim 1, wherein the user-selectable media application control corresponds to at least one of a closed captioning control, a fast forward control, or a pause control.

6. The apparatus of claim 1, further including means for sending a communication to a data collection entity, the communication including the determination of whether the media is an advertisement or the media includes an advertisement.

7. The apparatus of claim 1, further including means for preventing the means for analyzing from determining whether the media is an advertisement or the media includes an advertisement when the media player application is determined to be buffering data.

8. The apparatus of claim 1, wherein:
  the means for analyzing is external to a device that is to implement the media player application; and
  the means for determining is external to the device that is to implement the media player application.

9. An apparatus comprising:
  memory;
  instructions; and
  processor circuitry to execute the instructions to:
    analyze a control message associated with a media player application to determine whether a user attempted to activate a user-selectable media application control presented in a user interface while the media player application presented media;
    analyze control data associated with the user-selectable media application control to determine whether the user-selectable media application control presented in the user interface was activated;
    determine at least one of the media is not an advertisement or the media does not include an advertisement when (a) the user attempted to activate the user-selectable media application control and (b) the user-selectable media application control presented in the user interface was activated; and
    determine at least one of the media is an advertisement or the media includes an advertisement when (a) the user attempted to activate the user-selectable media application control and (b) the user-selectable media application control presented in the user interface was not activated.

10. The apparatus of claim 9, wherein the at least one processor is to identify the control data associated with the user-selectable media application control in a stream of data received by the media player application.

11. The apparatus of claim 9, further including a storage device to store data representative of the media.

12. The apparatus of claim 9, wherein the at least one processor is to extract the control data from media player data corresponding to the media player application.

13. The apparatus of claim 9, wherein the user-selectable media application control corresponds to at least one of a closed captioning control, a fast forward control, or a pause control.

14. The apparatus of claim 9, wherein the at least one processor is to communicate to a data collection entity, the communication including the determination of whether the media is an advertisement or the media includes an advertisement.

15. The apparatus of claim 9, wherein the at least one processor is to prevent the determination of whether the media is an advertisement or the media includes an advertisement when the media player application is determined to be buffering data.

16. The apparatus of claim 9, wherein the at least one processor is external to a device that is to implement the media player application.

17. An apparatus comprising:
  a data analyzer to determine whether a user-selectable media application control presented in a user interface was activated in response to a user attempt to activate the user-selectable media application control while a media player application presented media; and
  a media type analyzer to determine at least one of the media is an advertisement or the media includes an advertisement in response to a determination that the user-selectable media application control presented in the user interface was not activated in response to the user attempt to activate the user-selectable media application control while the media player application presented the media.

18. The apparatus of claim 17, wherein the media type analyzer is to determine at least one of the media is not an advertisement or the media does not include an advertisement in response to a determination that the user-selectable media application control presented in the user interface was activated in response to the user attempt to activate the user-selectable media application control while the media player application presented the media.

19. The apparatus of claim 17, further including a buffer analyzer is to prevent the media type analyzer from determining whether the media is an advertisement or the media includes an advertisement when the media player application is determined to be buffering data.

20. The apparatus of claim 17, wherein:
  the data analyzer is external to a device that is to implement the media player application; and
  the media type analyzer is external to the device that is to implement the media player application.

* * * * *